United States Patent [19]

Ferrero-Heredia et al.

[11] Patent Number: 5,530,035
[45] Date of Patent: Jun. 25, 1996

[54] METHOD OF PREPARING POLYURETHANE FOAM OF LOW THERMAL CONDUCTIVITY

[75] Inventors: Monica A. Ferrero-Heredia, East Greenbush; James Day; George L. Gaines, Jr., both of Scotia, all of N.Y.

[73] Assignee: General Electric Company, Schenectady, N.Y.

[21] Appl. No.: 268,082

[22] Filed: Jun. 15, 1994

[51] Int. Cl.⁶ .................................................. C08G 18/00
[52] U.S. Cl. .................... 521/170; 521/155; 521/163; 521/164; 528/48; 528/52; 528/76; 528/85; 524/196; 524/198
[58] Field of Search .................. 521/170, 155, 521/163, 164; 528/48, 52, 76, 85; 524/196, 198

[56] References Cited

U.S. PATENT DOCUMENTS 5,278,195  1/1994  Volkert et al. ............................. 521/98
5,371,113  12/1994  Ward, III et al. ......................... 521/124

*Primary Examiner*—James J. Seidleck
*Assistant Examiner*—Duc Truong
*Attorney, Agent, or Firm*—William H. Pittman

[57] ABSTRACT

Closed cell polyurethane foams, useful as thermal insulation for refrigerators and the like, are prepared by blending a polyisocyanate, a polyol and a suspension of at least one solid alkaline reagent, preferably sodium hydroxide, in an inert carrier liquid having a suitable viscosity. Preferred carrier liquids include polyepoxides and polyoxyalkylenediamines. The alkaline reagent reacts with and removes the carbon dioxide employed as a blowing agent, thus decreasing the thermal conductivity of the foam.

20 Claims, No Drawings

METHOD OF PREPARING POLYURETHANE FOAM OF LOW THERMAL CONDUCTIVITY

BACKGROUND OF THE INVENTION

This invention relates to insulating foams, and more particularly to polyurethane foams having unusually low thermal conductivity.

Insulating polyurethane foam is an indispensable constituent of many refrigerators and similar cooling units. By reason of increasingly strict Federal Government energy conservation standards, it is of interest to develop foams having substantially lower thermal conductivity than those presently available.

Conventional insulating polyurethane foam is generally prepared by the reaction of at least one polyol with at least one diisocyanate in the presence of suitable catalysts, surfactants and blowing agents. Among the blowing agents employed are halogenated compounds, which may be halocarbons such as monofluorotrichloromethane and/or halohydrocarbons such as 1,1-dichloro- 1-fluoroethane. They remain in the cell voids of the foam after blowing, and their presence therein is beneficial since they have very low thermal conductivity and thus contribute to the insulating quality of the foam.

Also usually present in the reaction mixture is water, which serves at least three purposes. First, in small quantities it is effective to improve the flow properties of the mixture. Second, it reacts with a minor proportion of the diisocyanate to form carbon dioxide, which is also effective as a blowing agent. Third, it reacts to form substituted urea crosslinking moieties, thus stabilizing the foam as it is produced.

It is apparent, therefore, that the presence of water is advantageous for many purposes. Its presence is also disadvantageous, however, in that the carbon dioxide produced therefrom, which remains in the foam cell voids, has a high thermal conductivity. Thus, a foam prepared with the use of a blowing agent combination including 15% and 50% (by volume) carbon dioxide has a thermal conductivity approximately 5% and 15%, respectively, higher than a corresponding foam prepared without the use of carbon dioxide.

Copending, commonly owned application Ser. No. 08/37, 841, now U.S. Pat. No. 5,371,113, discloses a method for producing insulating foam which employs carbon dioxide as a blowing agent, but which also affords a foam free from carbon dioxide or containing only very minor proportions thereof. Said method comprises foaming the polyurethane with a blowing agent comprising, at least in pan, carbon dioxide, in the presence of a solid alkaline reagent such as sodium hydroxide or soda lime, which is incorporated in said foam and which is capable of removing said carbon dioxide. According to the preferred method disclosed therein, the alkaline reagent, either neat or encapsulated in a polymer or other encapsulating agent, is mixed with a portion of the polyol to form a slurry which is then blended with the other polyurethane-forming materials to form a closed cell foam.

Problems have been encountered with the use of neat alkaline reagent when a conventional foam-producing nozzle is employed for mixing. Under these conditions, caustics such as sodium hydroxide undergo reaction with the polyol which results in crosslinking and inactivation thereof. This is accompanied by a drastic increase in the viscosity of the slurry, making unfeasible its injection into the mixing head at normal operating pressures.

SUMMARY OF THE INVENTION

The present invention provides a method for producing closed cell polyurethane foam of low thermal conductivity which includes the removal of carbon dioxide employed as a blowing agent by reaction with a solid alkaline reagent. Said method maintains the viscosity of one of the three reactant streams for the polyurethane at a suitable level for the employment of conventional mixing nozzles to effect intimate mixing of said streams, and permits the production of foam of low thermal conductivity without the employment of such cumbersome procedures as encapsulation of the alkaline reagent.

The invention is a method for preparing a closed cell polyurethane foam of high insulating power which comprises simultaneously blending at least one polyisocyanate, at least one polyol and a suspension of at least one solid alkaline reagent in a carrier liquid; said carder liquid being one which has a viscosity at 25° C. in the range of about 100–1000 centipoise, which is effective to maintain said alkaline reagent in stable suspension, which is compatible with closed cell polyurethane foams and in contact with which said alkaline reagent has a shelf life of at least about 15 days, and foaming the resulting blend in the presence of a blowing agent comprising, at least in part, carbon dioxide.

DETAILED DESCRIPTION; PREFERRED EMBODIMENTS

The polyurethane-forming reagents employed according to the present invention are conventional and are well known in the art, and therefore do not require extended discussion herein. In general, said reagents include at least one polyol, typically a poly(oxyalkylene) polyol, and at least one diisocyanate such as toluene diisocyanate, employed in proportions effective to produce the desired polyurethane as a reaction product. Also typically present are catalysts such as amines and organotin compounds, as illustrated by dimethylcyclohexylamine and dibutyltin dilaurate; and surfactants, typically silicone compounds.

The presence of at least one blowing agent is also necessary for production of the desired foam. Carbon dioxide is employed as at least part of the blowing agent. It is typically produced in situ by the reaction of diisocyanate with water added as a flow control agent. Most often, water is employed in an amount to provide carbon dioxide in the amount of about 1–60%, preferably about 2–50% and most preferably about 5–25% by weight of total blowing agent.

In most instances, a second blowing agent employed is a halogenated compound. It may be at least one halocarbon, as illustrated by chlorofluorocarbons and especially monofluorotrichloromethane, and/or at least one halohydrocarbon, as illustrated by 1,1-dichloro-1-fluoroethane. It is usually present in the amount of about 15–25% by weight, based on total reactants, catalyst and surfactant. As previously noted, it remains in the cell voids of the foam and decreases its thermal conductivity, improving the insulating properties thereof.

Another essential feature of the invention is the employment of at least one solid alkaline reagent which is incorporated in said foam and which is capable of removing carbon dioxide. It is preferably added as a finely divided powder, although larger particles such as granules (maximum particle size up to about 2 mm.) may also be effective. Over a period of time, the alkaline reagent removes the carbon dioxide in the cell voids of the foam by reaction therewith. Typical times required for removal are on the order of 1–2 months.

Suitable alkaline reagents include alkali metal and alkaline earth metal oxides and hydroxides, as exemplified by lithium hydroxide, sodium hydroxide, calcium oxide and hydroxide and barium oxide and hydroxide. Mixtures of these reagents may also be employed. An example is soda lime which is a mixture of calcium oxide with about 5–20% sodium hydroxide, said mixture generally also containing about 6–18% water. Sodium hydroxide is generally preferred, since it is particularly effective in the absence of encapsulation.

The crux of the present invention is the introduction of the solid alkaline reagent in a carrier liquid, which may be a single compound or a mixture of compounds. The carder liquid has four essential properties.

In the first place, the viscosity of the carrier liquid must be in the range of about 100–1000 centipoise at 25° C. This fact, combined with its high polarity, enables it to form a relatively stable slurry with the alkaline reagent.

In the second place, the carder liquid must be effective to maintain said alkaline reagent in stable suspension. This may be achieved, for example, by having present therein at least one highly polar component, generally in the amount of at least about 10% and preferably at least about 20% by weight of total carrier liquid. High polarity is generally provided by the presence of at least one constituent having chemically combined oxygen or nitrogen atoms with at least one free electron pair.

In the third place, the carrier liquid must be compatible with the closed cell polyurethane foam produced. This rules out solutions of polymers which are incompatible with polyurethanes, such as those that convert the foam to an open cell foam.

In the fourth place, the carder liquid must be a material in contact with which the alkaline reagent has a shelf life of at least about 15 and preferably at least about 30 days. Thus, said liquid may undergo reaction with the alkaline reagent but any such reaction is slow enough that the latter can first be introduced into the foam for reaction with the carbon dioxide present therein.

Illustrative materials of suitably high polarity and other advantageous properties are polyepoxides, particularly bisphenol (especially bisphenol A) diglycidyl ethers and epoxy novolak resins, examples of which are commercially available from Dow Chemical under the trade names "D.E.R." and "D.E.N.", respectively, and polyoxyalkylenediamines, as illustrated by the polyoxypropylenediamines sold by Texaco Chemical Company under the tradename JEFFAMINE. In neat form, the polyepoxides are generally too viscous to be used alone; it is therefore preferred to dissolve them in a substantially inert liquid of low viscosity, preferably a portion of the halogenated compound employed as a constituent of the blowing agent. In this way, a solution having the desired viscosity can readily be prepared. The polyoxyalkylenediamines generally have the requisite viscosity without dissolution.

Among the polyepoxides, the epoxy novolaks are often preferred since they are essentially free from active hydrogens. Bisphenol-derived polyepoxides normally include condensation products having in their structure hydroxy groups formed by ring-opening of epoxide groups, and the active hydrogen atoms therein can react with the alkaline reagent and decrease the shelf life of the combination.

The amount of alkaline reagent employed in the fabrication of the polyurethane foam is an amount effective to remove a substantial proportion, typically at least about 70%, of the carbon dioxide in the foam within the aforementioned period of about 1–2 months after foaming. The amount adequate for this purpose will vary according to the reagent employed, its particle size and other conditions, but can easily be determined by simple experimentation. In general, the molar ratio of alkaline reagent to theoretical carbon dioxide is in the range of about 1–3:1, preferably about 1.4–1.8:1. These proportions generally correspond to a weight proportion of alkaline reagent in the foam of about 1.5–4.5% and preferably about 2.1–2.7%. A corresponding proportion of suspension, relative to polyol and diisocyanate, is accordingly employed.

In a typical foam-producing operation according to the present invention, diisocyanate is one reactive stream; polyol, halocarbon or halohydrocarbon, catalysts and surfactants and water form a second; and the third is the suspension of alkaline reagent. The three streams may be mixed in a conventional foam-producing nozzle or mixing head.

The proportion of alkaline reagent in the combination thereof with the carrier liquid is generally in the range of about 20–80% by weight, with about 40–70% being preferred.

Other constituents may also be present in the combination of the alkaline reagent and carrier liquid. For example, talc may be incorporated therein as an anti-caking agent, typically in the amount of about 5–15% by weight. A visual indicator such as carbon black may also be present, typically in the amount of about 1–5% by weight, to facilitate monitoring of the dispersion of the alkaline reagent in the foam.

The invention is illustrated by the following examples. All parts and percentages are by weight.

EXAMPLE 1

A solution consisting of equal parts of 1,1-dichloro-1-fluoroethane and "D.E.R. 331", a polyepoxy compound consisting principally of bisphenol A diglycidyl ether and having an epoxide equivalent weight in the range of 182–192, was prepared and 72 parts thereof was combined, in a dry nitrogen atmosphere, with 20 parts of talc, 5 parts of carbon black and 100 parts of dry finely ground sodium hydroxide to form an alkaline suspension.

A masterbatch was prepared from 68.54 parts (by weight) of a poly(oxyalkylene) polyol blend, 1.37 parts of cyclohexyldimethylamine, 0.15 part of dibutyltin dilaurate, 0.34 part of a silicone surfactant and 0.6 part of water. The masterbatch, as a first stream, was blended in a mixing head with a second stream consisting of a mixture of 82.9 parts of toluene diisocyanate and 29 parts of 1,1-dichloro-1-fluoroethane, and a third stream consisting of an amount of the alkaline suspension to provide 2.18% sodium hydroxide in the foam. The resulting reaction mixture contained, as blowing agents, 86.5% 1,1-dichloro-1-fluoroethane and 13.5% carbon dioxide, and was converted to a closed cell foam panel.

After 45 days, the foam made according to the invention contained only about 0.6% while the control contained 18.2% carbon dioxide, based on total blowing agent. The product foam and control had thermal conductivities at this time of $1.79 \times 10^{-2}$ and $1.92 \times 10^{-2}$ W/m°K. respectively, for a 6.8% decrease afforded by the method of the invention.

EXAMPLE 2

The procedure of Example 1 was repeated, substituting for the alkaline suspension a suspension of 100 parts of sodium hydroxide in 90 parts of a solution prepared by blending 1 part of 1,1-dichloro-1-fluoroethane with 4 parts of "D.E.N. 431", an epoxy novolak containing an average of 2.2 epoxy groups per molecule. Said suspension was incorporated in the foam in the amount of 2.2% sodium hydroxide.

After 18 days, the product foam and the control had thermal conductivities of $1.70 \times 10^{-2}$ and $1.81 \times 10^{-2}$ W/m°K., for a decrease of 6.3% afforded by the method of the invention.

EXAMPLE 3

The procedure of Example 1 was repeated, substituting for the alkaline suspension a suspension of 100 parts of sodium hydroxide in 60 parts of "Jeffamine D-2000", a polyoxypropylenediamine having a molecular weight of about 2000. Said suspension was incorporated in the foam in the amount of 2.7% sodium hydroxide.

After 30 days, the percentages of carbon dioxide based on total blowing agent in the product and control foams were 1% and 17%, respectively. The thermal conductivities were $1.71 \times 10^{-2}$ W/m°K. and $1.84 \times 10^{-2}$, respectively. Thus, the decrease in thermal conductivity afforded by the method of the invention was 7%.

What is claimed is:

1. A method for preparing a closed cell polyurethane foam of high insulating power which comprises simultaneously blending at least one polyisocyanate, at least one polyol and a suspension of at least one solid alkaline reagent in a carrier liquid; said carrier liquid being one which has a viscosity at 25° C. in the range of about 100–1000 centipoise, which is effective to maintain said alkaline reagent in stable suspension, which is compatible with closed cell polyurethane foams and in contact with which said alkaline reagent has a shelf life of at least about 15 days, and foaming the resulting blend in the presence of a blowing agent comprising, at least in part, carbon dioxide.

2. A method according to claim 1 wherein the carbon dioxide is produced in situ by the reaction of water with diisocyanate.

3. A method according to claim 2 wherein the blowing agent also comprises at least one halogenated compound.

4. A method according to claim 3 wherein the halogenated compound is at least one halocarbon or halohydrocarbon.

5. A method according to claim 3 wherein the halogenated compound is 1,1-dichloro-1-fluoroethane.

6. A method according to claim 4 wherein the carbon dioxide comprises about 2–50% by volume of total blowing agent.

7. A method according to claim 6 wherein the carbon dioxide comprises about 5–25% by volume of total blowing agent.

8. A method according to claim 4 wherein the alkaline reagent is sodium hydroxide.

9. A method according to claim 8 wherein the molar ratio of said alkaline reagent to theoretical carbon dioxide is in the range of about 1–3:1.

10. A method according to claim 9 wherein the molar ratio of said alkaline reagent to theoretical carbon dioxide is in the range of about 1.4–1.8:1.

11. A method according to claim 9 wherein the carbon dioxide comprises about 5–25% by weight of total blowing agent.

12. A method according to claim 4 wherein the carrier liquid in contact with said alkaline reagent has a shelf life of at least about 30 days.

13. A method according to claim 4 wherein the carrier liquid is the combination of at least one polyepoxide and the halogenated compound employed as a blowing agent.

14. A method according to claim 13 wherein the carrier liquid comprises at least about 10% polyepoxide.

15. A method according to claim 14 wherein the carrier liquid comprises at least about 20% polyepoxide.

16. A method according to claim 13 wherein the polyepoxide is a bisphenol diglycidyl ether.

17. A method according to claim 16 wherein the polyepoxide is bisphenol A diglycidyl ether.

18. A method according to claim 13 wherein the polyepoxide is an epoxy novolak resin.

19. A method according to claim 4 wherein the carrier liquid is a polyepoxyalkylenediamine.

20. A method according to claim 4 wherein blending is effected in a foam-producing mixing head.

\* \* \* \* \*